(12) United States Patent
Tentscher et al.

(10) Patent No.: US 11,731,707 B2
(45) Date of Patent: Aug. 22, 2023

(54) INSTRUMENT PANEL SUPPORT FOR A MOTOR VEHICLE

(71) Applicant: Kirchhoff Automotive Deutschland GmbH, Attendorn (DE)

(72) Inventors: Dominik Tentscher, Hemer (DE); Alexander Günther, Olpe (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 55 days.

(21) Appl. No.: 17/637,398

(22) PCT Filed: Sep. 7, 2020

(86) PCT No.: PCT/EP2020/074961
§ 371 (c)(1),
(2) Date: Feb. 22, 2022

(87) PCT Pub. No.: WO2021/048059
PCT Pub. Date: Mar. 18, 2021

(65) Prior Publication Data
US 2022/0281532 A1   Sep. 8, 2022

(30) Foreign Application Priority Data

Sep. 9, 2019 (DE) ...................... 10 2019 124 074.3

(51) Int. Cl.
*B62D 25/14* (2006.01)
*B62D 27/06* (2006.01)

(52) U.S. Cl.
CPC ......... *B62D 25/145* (2013.01); *B62D 27/065* (2013.01)

(58) Field of Classification Search
CPC .............................. B62D 25/145; B62D 27/065
(Continued)

(56) References Cited

U.S. PATENT DOCUMENTS

| 8,950,794 B2 | 2/2015 | Lenkenhoff |
| 9,446,799 B2 | 9/2016 | Franzpötter |

(Continued)

FOREIGN PATENT DOCUMENTS

| CN | 205632681 U | 10/2016 |
| DE | 10155617 A1 | 11/2002 |

(Continued)

OTHER PUBLICATIONS

International Search Report dated Mar. 18, 2021 in parent International application PCT/EP2020/074961.

(Continued)

*Primary Examiner* — Jason S Morrow
*Assistant Examiner* — Veronica M Shull
(74) *Attorney, Agent, or Firm* — Polson Intellectual Property Law, PC; Margaret Polson; Christopher Sylvain (57) ABSTRACT

An instrument panel support for installation between the two A-pillars of a motor vehicle. The instrument panel support comprises a crossmember which extends between the A-pillars and has at least one connecting member at each end for connecting the instrument panel support to the vehicle via fasteners. The connecting members have a U-shaped main body connected to the crossmember, its longitudinal axis aligned in the z-direction, with at least one support insert extending between the two wings and penetrated by a fastener for connecting the instrument panel support on the vehicle side. The opening side of the main body points in the transverse direction to the longitudinal extension of the crossmember. The support insert and the spine of the main body have fastening apertures aligned with one another at least in regions for passing the shank of a fastener therethrough.

16 Claims, 6 Drawing Sheets

(58) Field of Classification Search
USPC .................. 296/193.01, 193.02, 70, 72
See application file for complete search history.

(56) References Cited

U.S. PATENT DOCUMENTS

| | | | |
|---|---|---|---|
| 9,580,107 B1* | 2/2017 | Ranga | B62D 25/145 |
| 9,598,100 B2 | 3/2017 | Lenkenhoff | |
| 9,764,764 B2 | 9/2017 | Irle | |
| 10,005,495 B2 | 6/2018 | Töller | |
| 10,577,025 B2 | 3/2020 | Michler | |
| 10,882,559 B2 | 1/2021 | Gündogan | |
| 11,142,248 B2 | 10/2021 | Günther | |
| 11,148,623 B2 | 10/2021 | Günther | |
| 11,235,720 B2 | 2/2022 | Höning | |
| 11,292,409 B2 | 4/2022 | Töller | |
| 11,505,146 B2 | 11/2022 | Weige | |
| 2010/0289296 A1 | 11/2010 | Brancheriau | |
| 2013/0154300 A1* | 6/2013 | Arzoumanian | B62D 25/145 296/72 |
| 2014/0138980 A1* | 5/2014 | Baudart | B62D 27/023 296/72 |
| 2016/0052562 A1* | 2/2016 | Yoshida | B62D 25/14 296/72 |
| 2019/0344385 A1 | 11/2019 | Töller | |
| 2022/0009435 A1 | 1/2022 | Günther | |
| 2022/0024399 A1 | 1/2022 | Tlauka | |
| 2022/0258684 A1 | 8/2022 | Günther | |
| 2022/0297524 A1 | 9/2022 | Günther | |
| 2022/0314912 A1 | 10/2022 | Töller | |
| 2022/0363211 A1 | 11/2022 | Günther | |
| 2023/0039843 A1 | 2/2023 | Gündogan | |

FOREIGN PATENT DOCUMENTS

| | | |
|---|---|---|
| DE | 2020130011387 U1 | 4/2014 |
| DE | 202010018333 U1 | 9/2015 |
| EP | 1228948 A1 | 8/2002 |
| EP | 1717130 A1 | 11/2006 |
| EP | 1816055 A1 | 8/2007 |
| WO | 2015090984 A1 | 6/2015 |
| WO | 2018030472 A1 | 2/2018 |
| WO | 2019063334 A1 | 4/2019 |

OTHER PUBLICATIONS

Written Opinion of the International Searching Authority dated Mar. 18, 2021 in parent International application PCT/EP2020/074961. Note: Machine translation provided. Consult official WIPO translation if unclear.
Examination Report dated Aug. 5, 2021 in related German application DE 10 2019 124 074.3. Machine translation provided.
Pending U.S. Appl. No. 17/635,487, filed Feb. 15, 2022. Per rule 609.07, copy not provided as this is available in the USPTO system.
Office action dated May 31, 2023 in related Chinese application 202080062801.4.

* cited by examiner

INSTRUMENT PANEL SUPPORT FOR A MOTOR VEHICLE

BACKGROUND

The present disclosure relates to an instrument panel support for a motor vehicle for installation between the two A-pillars.

Instrument panel supports of this type are designed as cross-members, which are arranged between the two A-pillars of a motor vehicle. Various assemblies, the pedals and the steering column are connected to the instrument panel support. Instrument panel supports of this type are also known as cross car beams. An instrument panel support may also be referred to as an instrument panel carrier or dashboard carrier.

Previously known designs of such instrument panel supports can have two separate hollow support profiles, namely a right-side hollow support profile and a left-side hollow support profile with respect to the longitudinal extension of the vehicle. These two hollow beam profiles are offset from each other, as described in EP 1 816 055 B1, so that they form an overlap region. Within this overlap region, the overlapping sections of the two hollow support profiles are connected by a beam connector.

Connecting members are connected at the ends of such a cross-member of an instrument panel support, with which the instrument panel support is connected to the A-pillars of the vehicle body. Various connection concepts for instrument panel supports to A-pillars are known from the prior art. According to a known design, the instrument panel support is connected with its connectors to an instrument panel support terminal connector arranged on the side of an A-pillar facing the vehicle interior. Such a terminal connector is—even with a different geometry—ultimately an angle piece, one wing of which is attached to the A-pillar and the other wing of which serves as the mounting base for connecting the instrument panel support. This wing has a connecting surface lying in or approximately in the y-z plane, against which rests the connecting member of an instrument panel support to be connected thereto and which is clamped to the terminal connector by means of one or more fasteners, such as screw fasteners. Other fasteners or fastening means can also be used here. This connecting surface of the vehicle-side terminal connectors points in the direction of the passenger compartment and thus in the direction of the respective B-pillar. The connecting members comprise a U-shaped main body, the longitudinal axis of which extends in the z-direction and the opening side of which points towards the A-pillar and thus in the longitudinal direction of the cross-member. In this configuration, the outer side of one of the connecting member's wings is in contact with the terminal connector. At those positions of such a connecting member at which the screw fasteners are passed through the main body, penetrating the two wings, sleeve-like support inserts are arranged which extend between the two mutually facing inner sides of the main body's wings. On the one hand, these support inserts provide a screw fastener channel through which the screw shank of a screw fastener for connecting the instrument panel support on the vehicle-side is passed. On the other hand, the support inserts serve the purpose of ensuring that the two wings of the main body maintain the intended distance from one another when a screw fastener is tightened and the clamping force acts on the outer sides, thereby ensuring that the required clamping force can be applied without facing deformation of the main body.

Numerous fastening arms are usually connected to the cross-member of such an instrument panel support, so as to support the cross-member, for example, at the base, fasten the steering unit and the pedals to it, and support or hold various assemblies. In addition, in many cases it is required that such an instrument panel support has connecting points at defined positions for connecting a manipulator as well as screw points for additional components of the instrument panel. Especially in the end area of such an instrument panel support, there should be such connecting and/or mounting points. For this purpose, additional mounting plates supporting one or more such connecting points are welded to such a connecting member or in the end section of the cross-member. It should be noted here that an instrument panel support in its basic configuration may well be installed in different vehicles, many of which will all have different additional connecting points in the region where such an instrument panel support is connected to the A-pillar. The effort required for this is therefore relatively high.

SUMMARY

Proceeding from this background, an aspect of the present disclosure is to provide an instrument panel support for a vehicle for installation between the two A-pillars, wherein the instrument panel support has a greater variability in terms of design of connecting points at its connection-side end section, and this variability can be realized by simple means.

This is achieved by an instrument panel support for a motor vehicle for installation between the two A-pillars, wherein the instrument panel support comprises a cross-member extending between the A-pillars, the cross-member supporting, on both its ends, in each case, at least one connecting member for connecting the instrument panel support on the vehicle side by means of screw fasteners, wherein the connecting members have a U-shaped main body connected to the cross member, its longitudinal axis aligned in the z-direction, with at least one support insert extending between the two wings of the main body and penetrated by a screw fastener for connecting the instrument panel support on the vehicle side, wherein the opening side of the main body points in the transverse direction to the longitudinal extension of the cross-member, and the support insert and the spine of the main body have fastening apertures aligned with one another at least in regions for passing through the shank of a screw fastener.

In this instrument panel support, the main bodies of the connecting members are U-shaped in cross section and aligned with their open side in the transverse direction to the longitudinal extension of the cross-member of the instrument panel support. Thus, according to one embodiment, the open side of the main body faces in the direction of the B-pillar. If an instrument panel support with such connecting members is mounted on the vehicle side using a terminal connector, the outer side of the main body's spine becomes the connecting or contact surface to the complementary surface of the terminal connector on the vehicle side. The screw fasteners used to connect the instrument panel support to such a terminal connector penetrate the rear wall of the main body and extend, as provided in one embodiment, parallel to its two wings. One or more support inserts are used to stiffen the main body and to provide a certain penetration length of a screw fastener through the main body, one support insert in each case being arranged at a position in which a screw fastener is provided. The support insert is supported against the inside of the main body's spine and is connected to the main body's wings, typically in a materially bonded manner. The main body and the support insert have fastening apertures aligned with one another at least in regions. This means that these are congruent at least in some regions, allowing a fastener to be passed through both openings.

Due to the orientation of the height of the main body's wings in the x-direction, their height can be determined more or less freely and is not limited by the adjacent A-pillar, in contrast to certain prior art. Although one of the main body's wings is typically connected to the crossmember of the instrument panel support while the other wing rests against the inside of the A-pillar, this places no limitation on the further design of the wings, in particular their height and their planar extension. If the contact surfaces described above are provided on the cross-member of the instrument panel support and on the inside of the A-pillar, the wing can also have a virtually arbitrary outline geometry and thus a virtually arbitrary height and areal extent. These wing sections, which are typically not used for contact, can, if provided, be designed to provide connecting points of whatever type. Such a main body is typically a punched and bent part, so that any wing contours can be provided accordingly by the outline geometry of the blank. The provision of such a blank is of course not limited to punching it out (punched and bent part), but also includes such embodiments in which the blank having the special geometry has been cut out of a larger blank before the forming process, for example by means of a laser. This is also to be regarded as a punched and bent part. Of course, in order to produce the connecting members, blanks with different material thicknesses, so-called tailored blanks, can also be used with regard to their material thickness.

It was surprising to note how high the variability is in the design of additional connecting points when these, without requiring additional components, are already part of the main body of the connecting member. Welding on additional connecting points, which is then no longer required in principle, even if possible in principle, prevents, or at least reduces, heat input induced by the unnecessary welding into such a connecting member and thus also prevents, or at least reduces, possible distortion in the end sections of such an instrument panel support.

This instrument panel support is further particularly advantageous in regard to the aforementioned greater variability in the provision of additional connecting points without having to change the screw fastener positions present on the vehicle side.

What has been described above with regard to the main body's wings, the free end terminations of which do not point in the direction of the transverse connection, applies mutatis mutandis to the spine extension of such a main body. This spine can also be made longer in the z-direction than is required for the vehicle-side screw fastening of the instrument panel support. Such a spine extension can be used to form one or more connecting points thereon. In one possible embodiment, such a spine extension is folded with respect to the plane of the spine, in order to provide an additional connecting point. Such a connecting point serves primarily to absorb forces in the z-direction. However, such a connecting point is also advantageous with regard to force absorption in the x-direction. A force acting in the x-direction on such a connecting point located in the x-y plane, for example used to connect the instrument panel, is absorbed by the spine in this same direction and then into the terminal connector, typically located on the outside of the spine, while not running parallel to the spine. An additional stiffening of such a folded tab supporting one or more connecting points can be provided by beading or by additionally connecting it to one of the two wings.

Even if, in principle, the opening side of such a main body can be open in the direction of the front end or also in the direction of the B-pillar, which depends on the arrangement of the terminal connector on the inside of the A-pillar of the respective vehicle, the opening side of the main bodies of the connecting members will generally be configured to face in the direction of the respective B-pillar of the vehicle.

The wing enlargements or extensions which go beyond the surface areas required for the connecting points on the vehicle side can, if desired, have stiffening structures, such as beads, embossings or the like, or can have bends if the plane of the connecting point is to be in a different plane than the respective wing. The above descriptions already make it clear that the two wings of such a main body do not have to be symmetrical to each other. Rather, they can have a completely different outline geometry, which typically results in a different wing surface provided by the respective wing. For example, it may be provided that one of the two wings of the main body of such a connecting member has a height which is the same over the height of the main body or at least substantially the entire height of the main body, while the other wing has such a height only in those sections in which it is required for holding the support inserts. In the other sections, this wing has a reduced height so that it is lighter than a conventional connecting member.

According to one embodiment, the support inserts themselves are U-shaped and supported with the free ends of their wings on the inside of the main body's spine. In a development, the support inserts have a hat-shaped cross-sectional geometry in that folded flanges are mounted on the free ends of the wings opposite these in directions pointing away from each other. Together with the spine, the support inserts form hollow body profile sections, the longitudinal extent of which is transverse to the longitudinal extent of the main body. This cross-sectional geometry, together with the typically material-fit connection of the support inserts to the inner walls of the main body, results in special stiffness, which on the one hand has a positive effect on the quality of the desired screw fastening. On the other hand, this also improves the overall connection of the instrument panel support to the A-pillar of the vehicle.

It is quite possible for such a main body of a connecting member to have an extension in the z-direction, so that a plurality of support inserts can be arranged therein. This may be, for example, two or even three support inserts. Such an embodiment may provide that the two support inserts are provided by a single insert part having the cross-sectional geometry of the two support inserts and a web as a connecting bar, which connects in each case two adjacent support inserts. Such a design is useful, if the tolerance in the spacing of two adjacent support inserts in one main body is to be kept small. The bar connecting the two support inserts also stiffens the relevant spine section of the main body. If this is not required, the spine section can have a cutout in the area of such a bar connecting two support inserts, so as to save weight and thus provide a positive effect in terms of low weight.

According to the design of the main body of such a connecting member, the sections in which the support inserts are located can have a different spine width. A main body having, for example, two support inserts may have, within its section extending in the z-direction in which a first support insert is arranged, a greater width than within the section in which the other support insert is provided.

If the installation conditions of such an instrument panel support in a motor vehicle require it, the main body may have a cranked portion between the support inserts or adjacent thereto without another support insert following, by which the spine sections adjoining the cranked portion are offset with respect to one another and thus are located in parallel or quasi-parallel y-z planes.

The directions used herein, namely the x-direction, y-direction and z-direction, are those normally used for a vehicle. The x-direction follows the longitudinal extension of the vehicle. The y-direction is the transverse direction thereto, and the z-direction runs in the direction of the vertical axis. The planes described herein are defined accordingly from these directions.

BRIEF DESCRIPTION OF THE DRAWINGS

The present disclosure is described below by means of example embodiments with reference to the accompanying figures, wherein.

DETAILED DESCRIPTION

Figure 1:
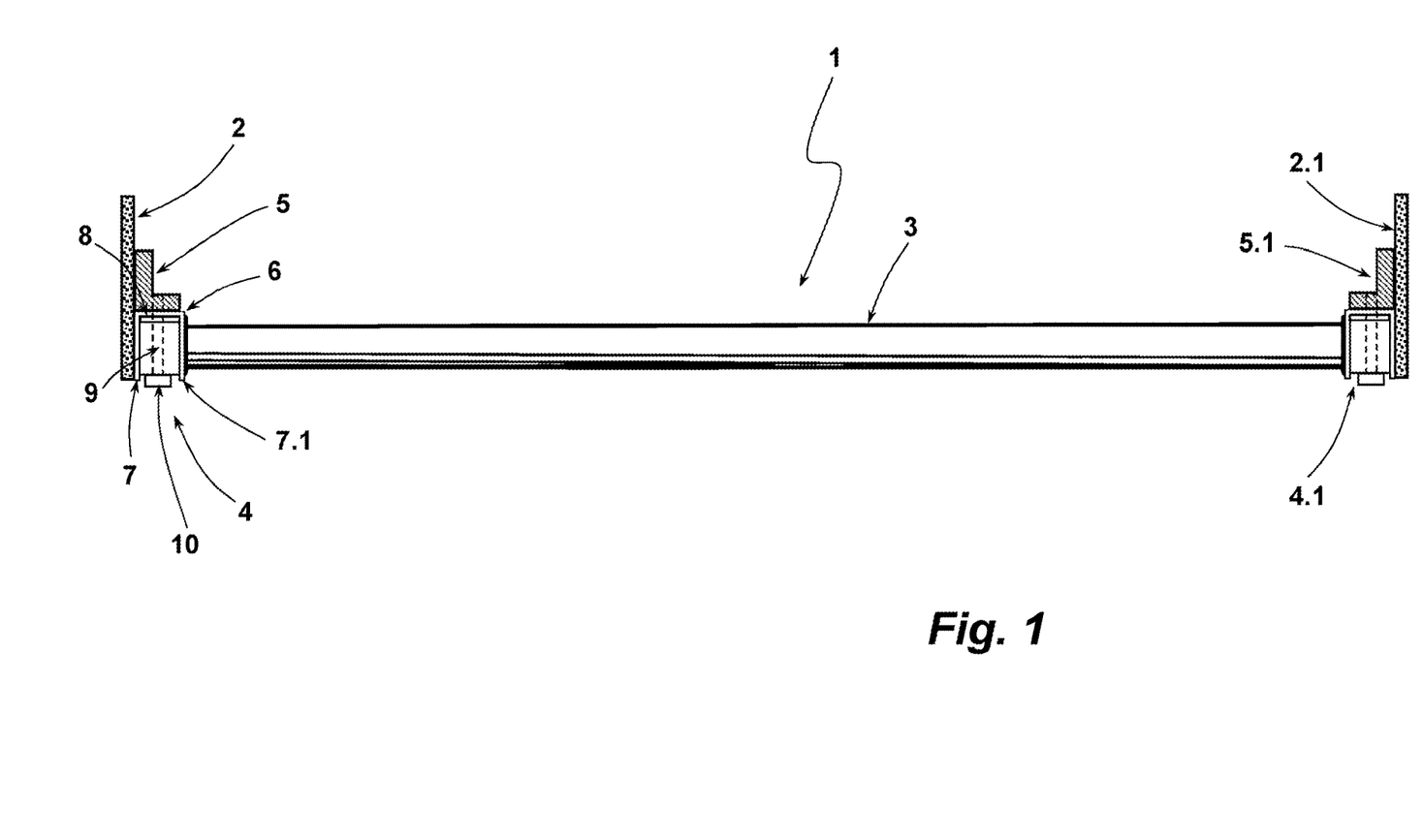
FIG. 1 shows a schematic top view of an instrument panel support when installed in a vehicle between the two A-pillars.

FIG. 1 shows an instrument panel support 1 when installed between two A-pillars 2, 2.1 of a vehicle (not otherwise shown in more detail). The instrument panel support 1 comprises a cross-member 3 which extends between the sides of the two A-pillars facing each other. With regard to the connection of the instrument panel support 1 to the A-pillars, means for providing tolerance compensation not shown in greater detail in the figure are provided. The cross-member 3 of the embodiment shown is a profiled, continuous tube. Instead of the cross-member 3 shown in the figures, other cross-members can also be used, in particular those which are assembled in modular fashion from a plurality of support pieces. The cross-member 3 need not necessarily have the straight design shown in FIG. 1, but may have cranked portions, offsets or the like. A connecting member 4, 4.1 is connected to the cross-member 3 at each longitudinal end. The connecting members are used for mounting the instrument panel support 1 on the vehicle side. For this purpose, in the example embodiment shown, a terminal connector 5, 5.1 is attached to each of the facing inner sides of the A-pillars 2, 2.1. The terminal connectors 5, 5.1 are designed as angle pieces, where one wing comes into contact with the inside of the A-pillars 2, 2.1 and is fastened thereto, and the other wing then projects from the plane of the A-pillars 2, 2.1 and serves with its outer side as a contact surface for a respective connecting member 4, 4.1.

The connecting member 4 comprises a U-shaped main body, the two wings 7, 7.1 of which are oriented away from the terminal connector 5. Thus, the opening side of the main body 6 is directed towards the B-pillar of the vehicle. The outer side of the spine 8 of the connecting member 4 rests against the outer side of one wing 7.1 of the terminal connector 5 facing towards the spine 8. Support inserts 9 are inserted in the main body 6. In FIG. 1, only one support insert 9 is visible due to the selected perspective. The instrument panel support 1 is fastened to the terminal connectors 5, 5.1 with screw fasteners 10, which penetrate the support inserts 9 of the connecting members 4, 4.1 and are fixed in or on the fastening wing of the connecting member 5, 5.1. For this purpose, the support inserts 9 are materially connected to the inner sides of the two wings 7, 7.1. In addition, the support inserts 9 are supported against the inside of the spine 8.

The connecting member 4.1 located on the other side of the cross-member 3 has an identical design. Thus, the above explanations regarding the connecting member 4 also apply to the connecting member 4.1. Identical parts can be used for connecting members 4, 4.1.

Figure 2A:
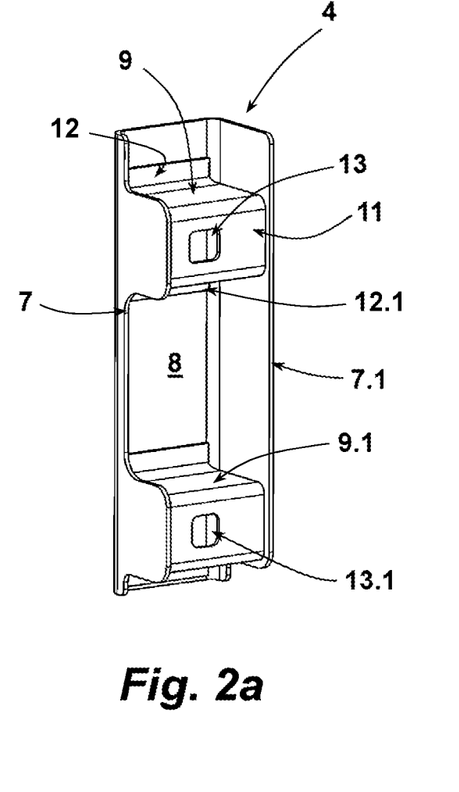
FIGS. 2a and 2b show two perspective views of a connector member of the instrument panel support according to FIG. 1, FIGS. 3a and 3b show two perspective views of the connecting member according to FIGS. 2a, 2b with the cross-member of the instrument panel support according to FIG. 1 connected thereto.
Figure 2B:
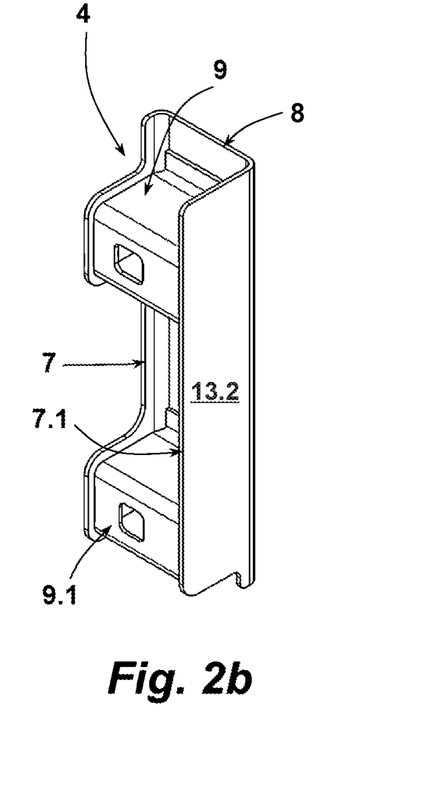

The connecting members 4, 4.1 are illustrated schematically in FIG. 1. In FIGS. 2a and 2b, the connecting member 4 is shown in two different perspective views with more details. In this example embodiment, the wing 7.1 essentially extends with a constant wing height (distance from the spine 8 towards the free end) over the entire longitudinal extension of the main body 6. The height of the wing 7.1 projects beyond the height of the support inserts 9, 9.1. This projection serves to form a groove between the upper side 11 of the support inserts 9, 9.1 and the inner side of the two wings 7, 7.1 for a weld seam with which the support inserts 9, 9.1 are materially joined to the inner sides of the wings 7, 7.1 with material fit. The weld seam is not shown in the figures.

In the illustrated example embodiment, the support insert 9 (identical in structure to the support insert 9.1) is a section of a profile with a hat-shaped cross-sectional geometry, the open side of which faces the inside of the spine 8. Flanges 12,12.1 angled with respect to the wings of the U-structure of the support insert 9 serve as a contact surface on the inside of the spine 8. The flanges 12, 12.1 are welded to the spine 8 of the main body 6, for example by spot welds.

The cross-member 3 is connected to the outer side 13.2 (see FIG. 2b) of the wing 7.1.

The outline geometry of the wing 7 differs from that of the wing 7.1, in that wing 7 has the same wing height as the wing 7.1 only in the sections in which the support inserts 9, 9.1 are located. In the other sections, the height of the wing 7 is reduced, namely by about 80%. In order to be able to connect the support inserts 9, 9.1 with a fillet weld also with respect to their legs on the inside of the wing 7, the length of the wing sections with the greater height of the wing 7 is somewhat greater than the extension of the support inserts 9, 9.1 in this respect. Due to the special design of the wing 7 of the main body 2, the connecting member 4 is weight-optimized. An aperture 13, 13.1 is made in the spine of the support inserts 9 forming the upper side 11, as well as at a complementary point in the spine 8 of the main body 2, so that a screw fastener 10 can pass through the connecting member 4 in the x-direction.

Figure 3A:
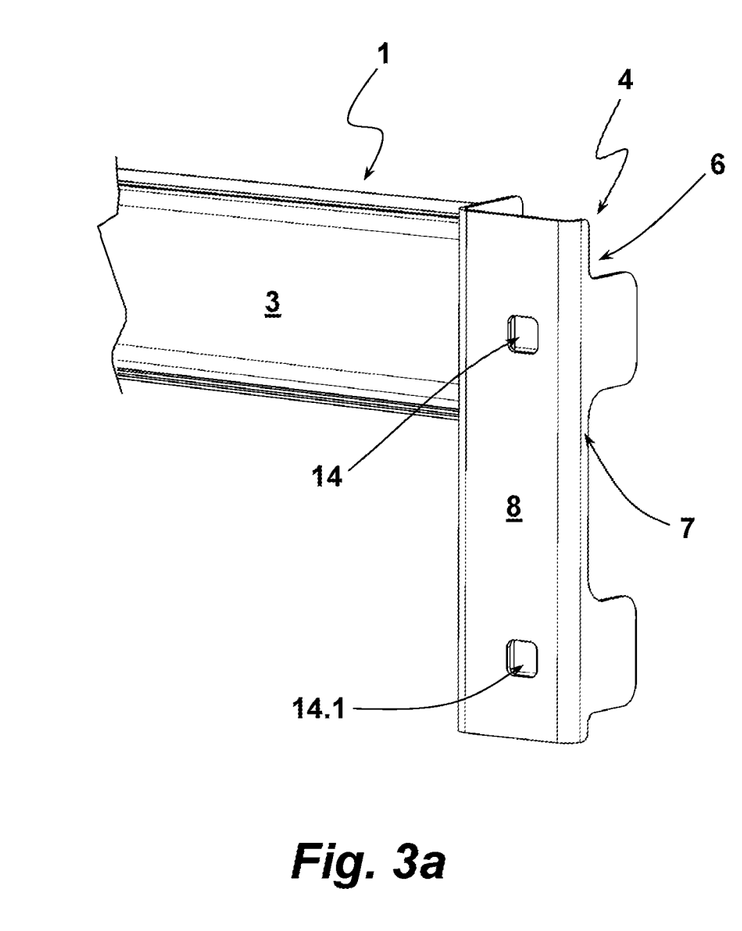
Figure 3B:
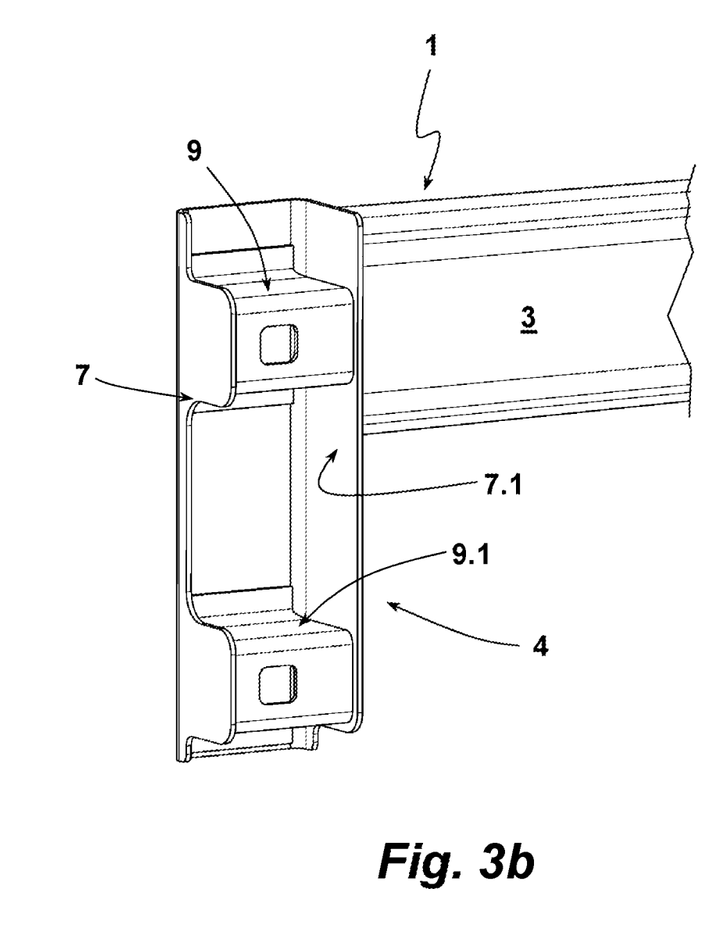

The left-hand end section of the instrument panel support 1 according to FIG. 1 is shown in FIGS. 3a, 3b in two different perspective views, namely looking forward in the direction of travel in FIG. 3b and looking backward in the direction of travel in FIG. 3a. In FIG. 3a, the apertures 14, 14.1 of the spine 8 of the main body 6 of the connecting member 4, which have already been addressed previously with respect to the connecting member 4, can be seen.

Figure 4:
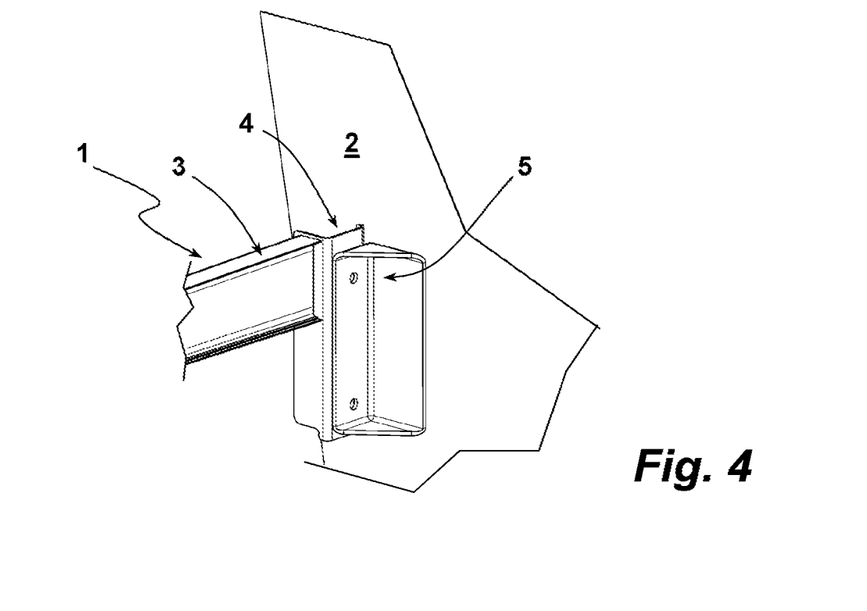
FIG. 4 shows a perspective view of the connection of the instrument panel support of FIG. 1 with its one end to the A-pillar of a motor vehicle.

The terminal connector 5 may be such an angle piece as is shown schematically in FIG. 4. The instrument panel support 1 connected thereto with its connecting member 4 is shown with its left-hand end section relative to the direction of travel. The illustration shown in FIG. 4 shows the installed instrument panel support 1 still without the screw fasteners inserted.

Figure 5:
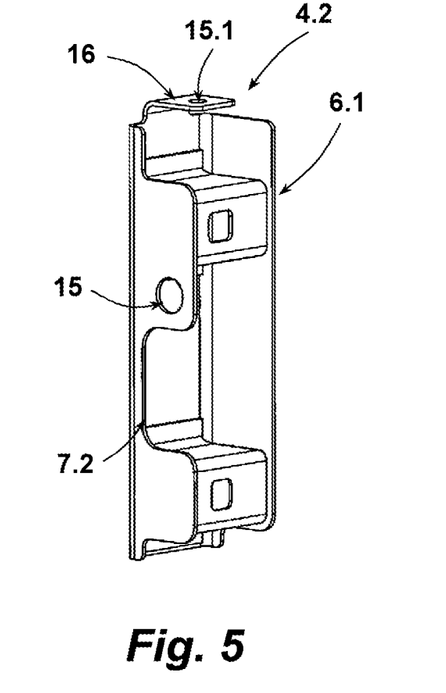
FIG. 5 shows a perspective view of another connecting member for an instrument panel support for connecting same on the vehicle side.

FIG. 5 shows a further embodiment of a connecting member 4.2 with a different embodiment of its main body 6.1. In the case of the main body 6.1, the wing 7.2 of the main body opposite the connection of the cross-member is used to provide an additional connecting point 15. In the embodiment illustrated, this is located in an extension of a section with a greater wing height. In addition, the connecting member 4.2 differs from the connecting members 4, 4.1 in that the spine 8.1 has an extension tab which points in the z-direction and is folded in the direction of the two wings of the main body 6.1. This extension tab 16 provides a further connecting point 15.1.

Figure 6:
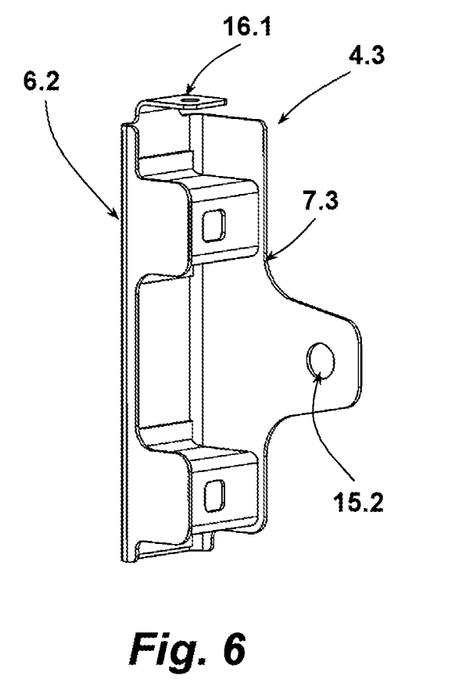
FIG. 6 shows a connecting member according to a further embodiment for connecting an instrument panel support on the vehicle side.

The connecting member 4.3 shown in FIG. 6 of yet another embodiment shows that also that wing of the main body 6.2 to which the cross-member is to be connected, namely the wing 7.3, can be used to provide a further connecting point 15.2. To provide the connecting point 15.2, the wing 7.3 of the main body 6.2 supports a corresponding extension tab in the x-direction. This connecting member 4.3 also has an extension tab 16.1 folded in the x-y plane mounted on the spine of its main body 6.2 for providing a further connecting point.

Figure 7:
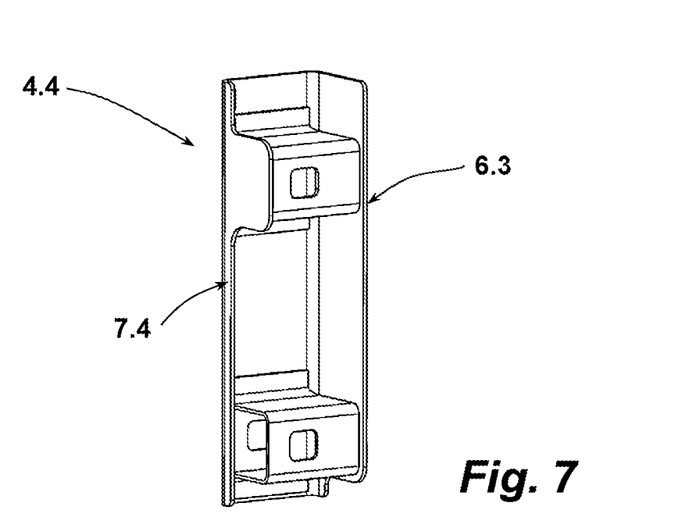
FIG. 7 shows a connecting member according to yet another embodiment for connecting an instrument panel support on the vehicle side.

FIG. 7 shows yet another possible design of a connecting member 4.4. This design corresponds to the design of the connecting members 4, 4.1, but the wing 7.4 of the main body 6.3 opposite the cross-member connection also has a reduced height in the region of the lower support insert.

Figures 8A, 8B:
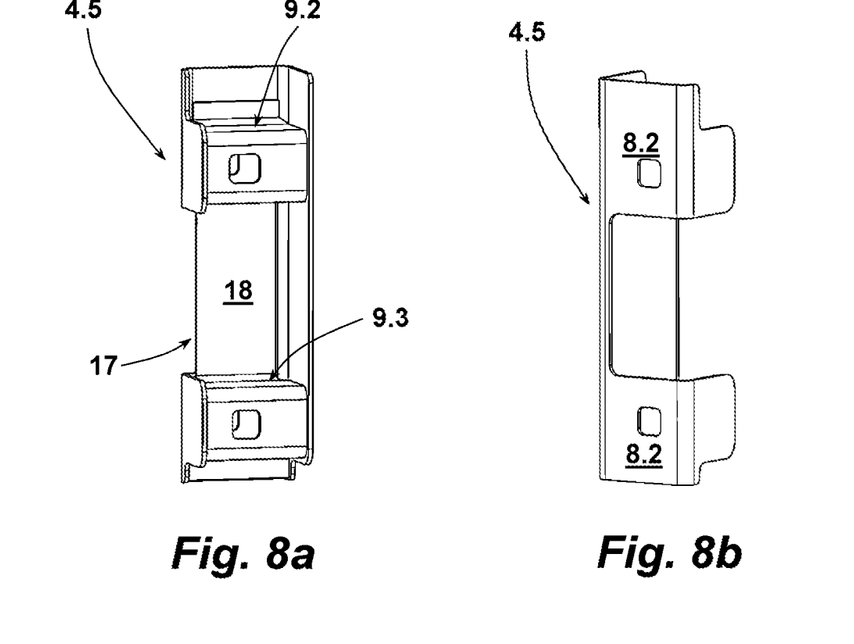
FIGS. 8a and 8b show two perspective views of yet another connecting member for connecting an instrument panel support to a vehicle on the vehicle side.

FIGS. 8a, 8b show a further connecting member 4.5 as part of an instrument panel support for connecting the same on the vehicle side. In the connecting member 4.5, the two support inserts 9.2, 9.3 are provided by a single support insert part 17. The two support inserts 9.2, 9.3 are also hat-profile shaped in cross-section, as in the case of the connecting member 4 or 4.1. However, in contrast to the connecting member 4 or 4.1, the flanges facing each other are connected by a connecting bar 18. Thus, in this embodiment, the spacing of the apertures in the support inserts 9.2, 9.3 is not determined by the assembly of the support inserts in relation to one another within the main body, but by the shaping process (forming process) with which the support insert part 17 is manufactured. In this design, the spacing of the support insert apertures may be provided with a lower tolerance. In order not to add weight to the connecting member 4, 5 by this measure, the spine 8.2 of the main body 6.4 is notched between the two support inserts 9.2, 9.3, as shown in FIG. 8b.

Figure 9A:
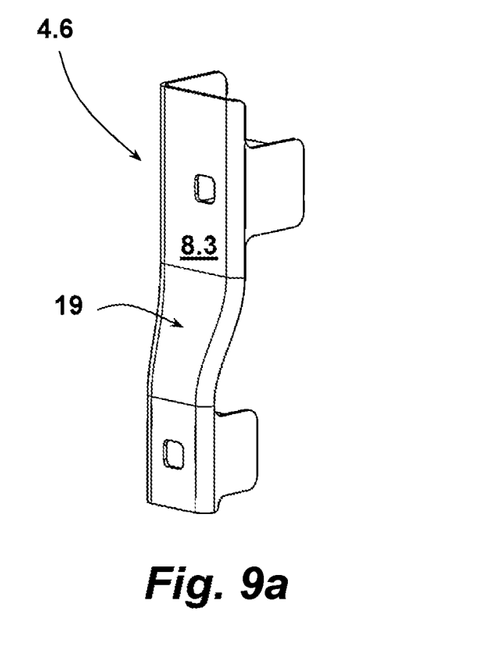
FIGS. 9a and 9b show two perspective views of yet another connecting member for connecting an instrument panel support to a vehicle on the vehicle side.
Figure 9B:
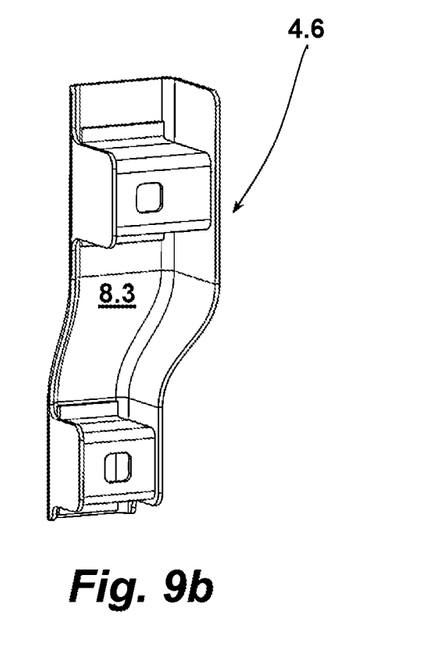

Yet another design of a connecting member 4.6 is shown in FIGS. 9a, 9b. In this example embodiment, the spine 8.3 of the main body 6.5 is cranked. The cranked portion is indicated by the reference numeral 19. Due to the cranked portion 19, the upper section in FIG. 9a with its support insert is in a different y-z plane than the lower section of the spine 8.3 with the other support insert. This may be necessary if the connecting member, as is the case with the connecting member 4.6, is to be adapted to certain geometries specified on the vehicle side. In addition to the cranked portion of the spine 8.3 described above, the width of the spine 8.3 is also different in its two sections accommodating a support insert (see in particular FIG. 9b). In this example embodiment, the cranked portion 19 is accompanied by a reduction in width from the upper wider spine section to the lower narrower spine section.

Figure 10:
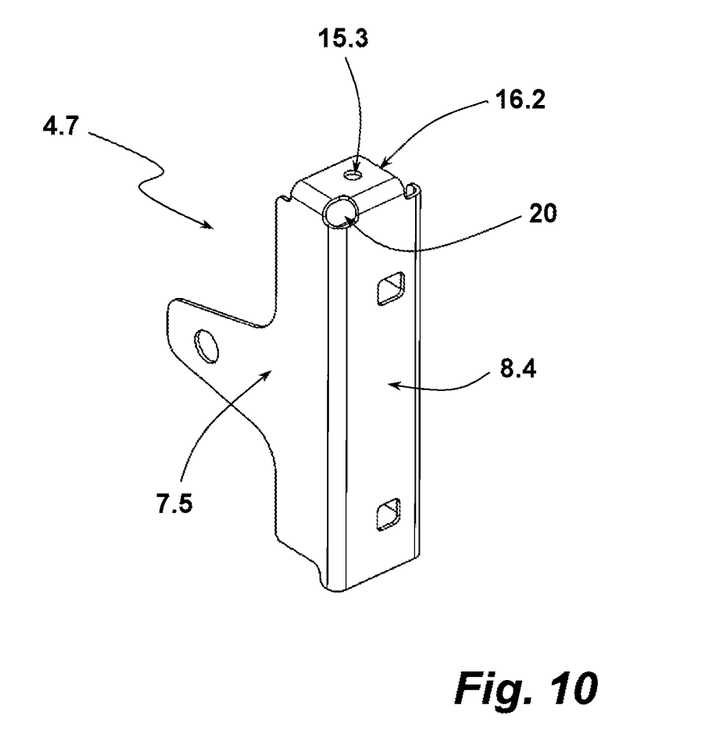
FIG. 10 shows a perspective view of a development of the connecting member according to FIG. 6.

FIG. 10 shows a perspective view of a further connecting member 4.7, which is configured in principle like the connecting member 4.3 according to FIG. 6. The connecting member 4.7 is shown looking at its spine 8.4. Like the connecting member 4.3, the connecting member 4.7 has a connecting point 15.3 located in the x-y plane. In contrast to the connecting member 4.3, the extension tab 16.2 of the connecting member 4.7 is connected to both the spine 8.4 and the wing 7.5. This increases the rigidity of the extension tab 16.2 in the event of transverse forces introduced into the connecting point 15.3. To facilitate the forming process, a punched-out portion 20 has been formed in the corner to be created between the wing 7.5, the spine 8.4 and the extension tab 16.2.

The description of the example embodiments makes it clear that, due to the clever arrangement of the respective connecting member in the connection arrangement between the cross-member and a vehicle-side contact, which in the illustrated embodiments is provided by the terminal connector, there is a wide range of possibilities for providing additional connecting points by changing the geometry of the wings. The examples described above represent only a few of a large number of possible embodiments. This also means that the portions of a wing supporting a connecting point may also be embossed, whether by beads for stiffening or by angled portions or embossments or the like. Just as this is shown with reference to the extension tab 16 of the spine 8 in the example embodiment of FIGS. 5 and 6, a wing extension of one or both of the main body's wings may also be folded one or more times to bring one or more connecting points located thereon into the desired spatial plane with respect to the orientation of the spine of the connecting member.

The invention has been described with reference to example embodiments. Without departing from the scope of the claims, there are numerous further ways and embodiments for a person skilled in the art to realize the invention, without these having to be described or shown in more detail within the context of this disclosure.

REFERENCE NUMERALS 1 instrument panel support
2, 2.1 A-pillar
3 cross-member
4, 4.1-4.7 connecting member
5, 5.1 terminal connector
6, 6.1-6.5 main body 7, 7.1-7.5 wing
8, 8.1-8.4 spine
9, 9.1-9.3 support insert
10 screw fastener
11 top
12, 12.1 flange
13, 13.1 aperture
14, 14.1 aperture
15, 15.1, 15.3 connecting point
16, 16.1, 16.2 extension tab
17 support insert part
18 connecting bar
19 cranked portion
20 punched-out portion

The invention claimed is:

1. An instrument panel support for installation between A-pillars of a motor vehicle, the instrument panel support comprising:
a crossmember with a longitudinal extension that extends between the A-pillars and which, at each end thereof, is connected to at least one connecting member for connecting the instrument panel support on a vehicle side,
wherein the connecting members have a U-shaped main body formed by two wings and a spine, with a longitudinal axis thereof aligned in the z-direction, and with at least one support insert extending between the two wings, wherein an opening side of the main body faces in a transverse direction to the longitudinal extension of the crossmember,
wherein the connecting members are fastened to the A-pillars via screw fasteners, wherein the support insert, for providing a certain penetration length for a screw fastener spaced apart from the spine, is supported on an inside of the spine and is connected to the wings of the main body, and wherein the support insert and the spine of the main body have fastening apertures aligned with one another for passing a shank of the screw fastener therethrough.

2. The instrument panel support of claim 1, wherein the opening side of the main body of the connecting member faces in the direction of a respective B-pillar of the motor vehicle.

3. The instrument panel support of claim 1, wherein the two wings of the main body formed on the spine have a different outline geometry with a different wing surface from one another.

4. The instrument panel support of claim 3, wherein one wing extends with constant wing height over an entire length of the main body, while the other wing has a reduced wing height along the length the main body in sections adjacent the at least one support insert.

5. The instrument panel support of claim 1, wherein an extension tab having a connecting point is molded on the spine of the connecting member.

6. The instrument panel support of claim 5, wherein the extension tab is folded with respect to the spine in the direction of the two wings.

7. The instrument panel support of claim 6, wherein the extension tab is additionally connected to at least one of the two wings.

8. The instrument panel support of the claim 1, wherein the support insert has a U-shaped cross-sectional geometry formed by two wings and a spine, and the support insert faces with an opening side thereof towards the spine of the main body.

9. The instrument panel support of claim 8, wherein flanges are molded on free ends of the wings of the support insert, and the flanges are folded with respect to the wings of the support insert in directions pointing away from each other.

10. The instrument panel support of claim 1, wherein the support insert is connected to the main body in a materially bonded manner.

11. The instrument panel support of claim 1, wherein the main body of at least one connecting member has at least two support inserts arranged therein.

12. The instrument panel support of claim 11, wherein the at least two support inserts are provided by a single insert part in which the support inserts are formed.

13. The instrument panel support of the claim 12, wherein the support inserts of the single insert part have a U-shaped cross-sectional geometry and face with opening sides thereof towards the spine of the main body.

14. The instrument panel support of claim 1, wherein the main body of at least one connecting member has at least two support inserts arranged therein, which main body has a spine section with a different spine width in a region of each support insert.

15. The instrument panel support of claim 14, wherein the main body with the at least two support inserts has a cranked portion located between two support inserts, and, as a result of the cranked portion, the spine sections adjacent to the cranked portion are offset from one another in different planes.

16. The instrument panel support of claim 1, wherein the main body of at least one connecting member has at least two support inserts arranged therein, which main body has a cranked portion located between two support inserts, and, as a result of the cranked portion, sections of the spine adjacent to the cranked portion are offset from one another in different planes.

* * * * *